United States Patent
Sakai

(10) Patent No.: US 7,155,977 B2
(45) Date of Patent: Jan. 2, 2007

(54) SEMICONDUCTOR DYNAMIC QUANTITY SENSOR

(75) Inventor: Minekazu Sakai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/253,579

(22) Filed: Oct. 20, 2005

(65) Prior Publication Data

US 2006/0107742 A1 May 25, 2006

(30) Foreign Application Priority Data

Nov. 25, 2004 (JP) .............................. 2004-340391

(51) Int. Cl.
*G01P 15/00* (2006.01)
*G01P 15/125* (2006.01)

(52) U.S. Cl. ............................... 73/504.12; 73/514.32; 73/514.29; 73/504.14

(58) Field of Classification Search ............. 73/504.02, 73/504.04, 504.12, 504.14, 514.32, 514.29, 73/514.36, 514.38, 504.15
See application file for complete search history.

(56) References Cited

U.S. PATENT DOCUMENTS 6,318,177 B1  11/2001  Buchan et al.

6,906,394 B1 *  6/2005  Muto et al. .................. 257/415

FOREIGN PATENT DOCUMENTS

JP          B2-2943477         10/1993

* cited by examiner

*Primary Examiner*—Helen Kwok
(74) *Attorney, Agent, or Firm*—Posz Law Group, PLC

(57) ABSTRACT

A capacitance type semiconductor dynamic quantity sensor includes a substrate having a support layer and a semiconductor layer mounted on the support layer, a weight portion displaceable in a predetermined direction, movable electrodes joined to the weight portion so as to be displaceable integrally with the weight portion, fixed electrodes disposed so as to confront the movable electrodes and beam-shaped beam portions that are deformable elastically to displace the weight portion. When a dynamic quantity is applied, the distance between each movable electrode and each fixed electrode being varied, and the applied dynamic quantity being detected on the basis of the capacitance variation between both the electrodes which is caused by the variation of this distance. The thickness h2 of the beam portion is set to be larger than the thickness h1 of the movable electrode.

6 Claims, 8 Drawing Sheets

SEMICONDUCTOR DYNAMIC QUANTITY SENSOR

CROSS REFERENCE TO RELATED APPLICATION

This application is based upon, claims the benefit of priority of, and incorporates by reference the contents of, Japanese Patent Application No. 2004-340391 filed on Nov. 25, 2004.

TECHNICAL FIELD

The technical field relates generally to a capacitance type semiconductor dynamic quantity sensor in which trenches are formed in a semiconductor layer mounted on a support layer to thereby form movable electrodes and fixed electrodes, and an applied dynamic quantity is detected on the basis of capacitance variation between both the movable and fixed electrodes under the application of the dynamic quantity.

BACKGROUND

A semiconductor dynamic quantity sensor of the above type has been proposed in which a substrate includes a semiconductor layer mounted on a support layer, and a weight portion displaceable in a predetermined direction, movable electrodes joined to the weight portion so as to be displaceable integrally with the weight portion, fixed electrodes disposed so as to confront the movable electrodes and elastically-deformable beam-shaped beam portions for displaying the weight portion are formed by forming trenches in the semiconductor layer.

FIG. 9 is a diagram showing a general planar construction of this type of semiconductor dynamic quantity sensor J100, and FIG. 10 is a cross-sectional view of the sensor J100 which is taken along a one-dotted chain line X—X of FIG. 9.

The semiconductor dynamic quantity sensor J100 as described above is formed by applying a well-known micromachining processing to a semiconductor substrate 10.

In this case, as shown in FIG. 9, the semiconductor substrate 10 constituting the semiconductor dynamic quantity sensor J100 is a rectangular SOI (silicon on insulator) substrate 10 having oxide film 13 as an insulating layer between a first silicon substrate 11 serving as a first semiconductor layer and also as a support layer and a second silicon substrate 12 serving as a semiconductor layer.

The semiconductor dynamic quantity sensor J100 is achieved by subjecting the second silicon substrate 12 of the semiconductor substrate 10 to trench etching to form trenches 14 so that a movable portion comprising beam portions 22, a weight portion 21 integrally formed with the beam portions 22 and movable electrodes 24, and fixed electrodes 31, 41 confronting the movable electrodes 24 are formed.

Each beam portion 21 has a spring function displaceable in a direction of arrow X of FIG. 9 in accordance with an applied dynamic quantity, and it has a beam-shape extending in the direction perpendicular to the displacement direction X. The weight portion 21 is supported by the beam portions 22 so as to constitute a spring-mass type mass portion which is supported by the beam portions 22 and uses the beam portions 22 as springs, and it is likewise displaceable in the displacement direction X.

The movable electrodes 24 are formed integrally with the weight portion 21, and are arranged in a comb-shape so as to project from both sides of the weight portion 21 in the direction perpendicular to the displacement direction X of the beam portions 22. The comb-shaped movable electrodes 24 are displaceable in the displacement direction X together with the beam portions 22.

The fixed electrodes 31, 41 are fixedly mounted on a first silicon substrate 11, and a plurality of fixed electrodes 31, 41 are arranged so as to be engaged with the gaps between the neighboring movable electrodes 24, and the side surfaces of the fixed electrodes 31, 41 are confronted to the side surfaces of the movable electrodes 24.

Here, in the semiconductor acceleration sensor J100 of FIG. 9, the total capacitance formed in the gaps between the movable electrodes 24 at the left side and the fixed electrodes 31 is represented by CS1, and the total capacitance formed in the gaps between the movable electrodes 24 at the right side and the fixed electrodes 41 is represented by CS2.

In the semiconductor dynamic quantity sensor J100, the distance between each movable electrode at the left side and each fixed electrode 31 and the distance between each movable electrode at the right side and each fixed electrode 41 are varied under application of a dynamic quantity, so that the capacitance CS1, CS2 between the electrodes 24 and 31 (41) is varied in connection with the above variation.

The signal corresponding to the capacitance difference (CS1−CS2) thus varied is output as an output signal from the semiconductor dynamic quantity sensor J100, and this signal is processed by a circuit portion (not shown) and finally output, whereby the dynamic quantity is detected.

The semiconductor dynamic quantity sensor J100 is manufactured as follows. That is, the trench etching is carried out from the surface of the second silicon substrate 12 serving as the semiconductor layer to form the movable portion including the weight portion 21 and the movable electrodes 24, the fixed electrodes 31, 41 and the beam portions 22 so that they are sectioned from one another, and then the weight portion 21 and the movable electrodes 24 and the insulating layer 13 below the beam portions 22 are removed by sacrifice layer etching to release these portions.

As described above, in the manufacturing process of the semiconductor dynamic quantity sensor J100, the gap of each beam portion 22 and the gap between each movable electrode 24 and each fixed electrodes 31, 41 are simultaneously formed by the trench etching.

In this case, various proposals have been made to improve the processing dispersion of the width of the beam portion 22, that is, the beam width and the interval between the movable electrode 24 and the fixed electrode 31, 41, that is, the electrode interval, which is caused by the trench etching (for example, see JP-A-2000-24965).

As described above, although various proposals have been made to improve the processing dispersion of the beam width and the electrode interval due to the trench etching, no improvement has been made to the processing dispersion of the thickness of the beam portion 22 and the thickness of the movable electrode 24.

In this type of semiconductor dynamic quantity sensor J100, the dynamic quantity is detected on the basis of the displacement using the spring-mass system of the beam portions 22, the weight portion 21 and the movable electrode 24, and the effect of the processing dispersion of the thickness of the beam portions 22 and the thickness of the movable electrode 24 on the sensor sensitivity cannot be neglected.

That is, such processing dispersion increases the sensitivity dispersion of the sensor, and it may adversely affect the yield and the precision of the sensor.

SUMMARY

In view of the foregoing problem, it is an object to provide a capacitance-type semiconductor dynamic quantity sensor including movable electrodes, fixed electrodes and beam portions for displacing the movable electrode that are formed by forming trenches in a semiconductor layer supported on a support layer, the sensitivity of the sensor being hardly affected by processing dispersion of the thickness of the beam portions and the thickness of the movable electrodes.

In order to attain the above object, according to a first aspect, a capacitance type semiconductor dynamic quantity sensor including a substrate having a support layer and a semiconductor layer mounted on the support layer in which a weight portion displaceable in a predetermined direction, movable electrodes joined to the weight portion so as to be displaceable integrally with the weight portion, fixed electrodes disposed so as to confront the movable electrodes and beam-shaped beam portions that are deformable elastically (i.e., like a spring) to displace the weight portion are formed by forming trenches on the semiconductor layer, when a dynamic quantity is applied, the distance between each movable electrode and each fixed electrode being varied, and the applied dynamic quantity being detected on the basis of the capacitance variation between both the electrodes which is caused by the variation of the distance concerned, wherein the thickness h2 of the beam portion is set to be larger than the thickness h1 of the movable electrode.

If the thickness h2 of the beam portion is set to be larger than the thickness h1 of the movable electrode, that is, the relationship of h1<h2 is satisfied like the first aspect, even when some processing dispersion exists in the thickness of the beam portions or the thickness of the movable electrodes, the sensitivity dispersion can be reduced to the minimum level (see FIG. 5).

That is, in the capacitance type semiconductor dynamic quantity sensor in which the movable electrodes, the fixed electrodes and the beam portions for displacing the movable electrodes are formed by forming the trenches in the semiconductor layer mounted on the support layer, the sensitivity hardly suffers the influence of the processing dispersion in the thickness of the beam portions and the thickness of the movable electrodes.

According to a second aspect, in the semiconductor dynamic quantity sensor of the first aspect, the width of each beam portion is represented by the beam width b, the interval between each movable electrode and each fixed electrode is represented by the electrode interval d and the width of each movable electrode is represented by the electrode width W, and when the ratio (b/d) of the beam width b to the electrode interval d is set to 1.0 to 1.75 and the ratio (W/b) of the electrode width W to the beam width b is set to 1.0 to 3.0, the ratio (h1/h2) of the thickness h1 of the movable electrode to the thickness h2 of the beam portion is set to 0.2 to 0.8.

By the setting the ratio (b/d), the ratio (W/b) and the ratio (h1/h2) to the above ranges like the second aspect, the effect of the first aspect can be properly implemented.

More specifically, according to a third aspect, in the semiconductor dynamic quantity sensor of the second aspect, when the ratio (b/d) of the beam width b to the electrode interval d is set to 1.0 to 1.75 and the ratio (W/b) of the electrode width W to the beam width b is set to 1.0, the ratio (h1/h2) of the thickness h1 of the movable electrode to the thickness h2 of the beam portion is set to 0.4 to 0.8.

More specifically, according to a fourth aspect, in the semiconductor dynamic quantity sensor of the second aspect, when the ratio (b/d) of the beam width b to the electrode interval d is set to 1.0 to 1.75 and the ratio (W/b) of the electrode width W to the beam width b is set to 1.75, the ratio (h1/h2) of the thickness h1 of the movable electrode to the thickness h2 of the beam portion is set to 0.3 to 0.7.

More specifically, according to a fifth aspect, in the semiconductor dynamic quantity sensor of the second aspect, when the ratio (b/d) of the beam width b to the electrode interval d is set to 1.0 to 1.75 and the ratio (W/b) of the electrode width W to the beam width b is set to 3.0, the ratio (h1/h2) of the thickness h1 of the movable electrode to the thickness h2 of the beam portion is set to 0.2 to 0.6.

Furthermore, according to a sixth aspect, in the semiconductor dynamic quantity sensors of the first to fifth aspects, a plurality of movable electrodes are arranged in a comb-shape and a plurality of fixed electrodes are arranged in a comb-shape so as to be engaged with the gaps between the neighboring movable electrodes arranged in a comb-shape.

BRIEF DESCRIPTION OF THE DRAWINGS

The above and other objects, features and advantages will become more apparent from the following detailed description made with reference to the accompanying drawings.

DETAILED DESCRIPTION OF THE PREFERRED EMBODIMENTS

Figure 1:
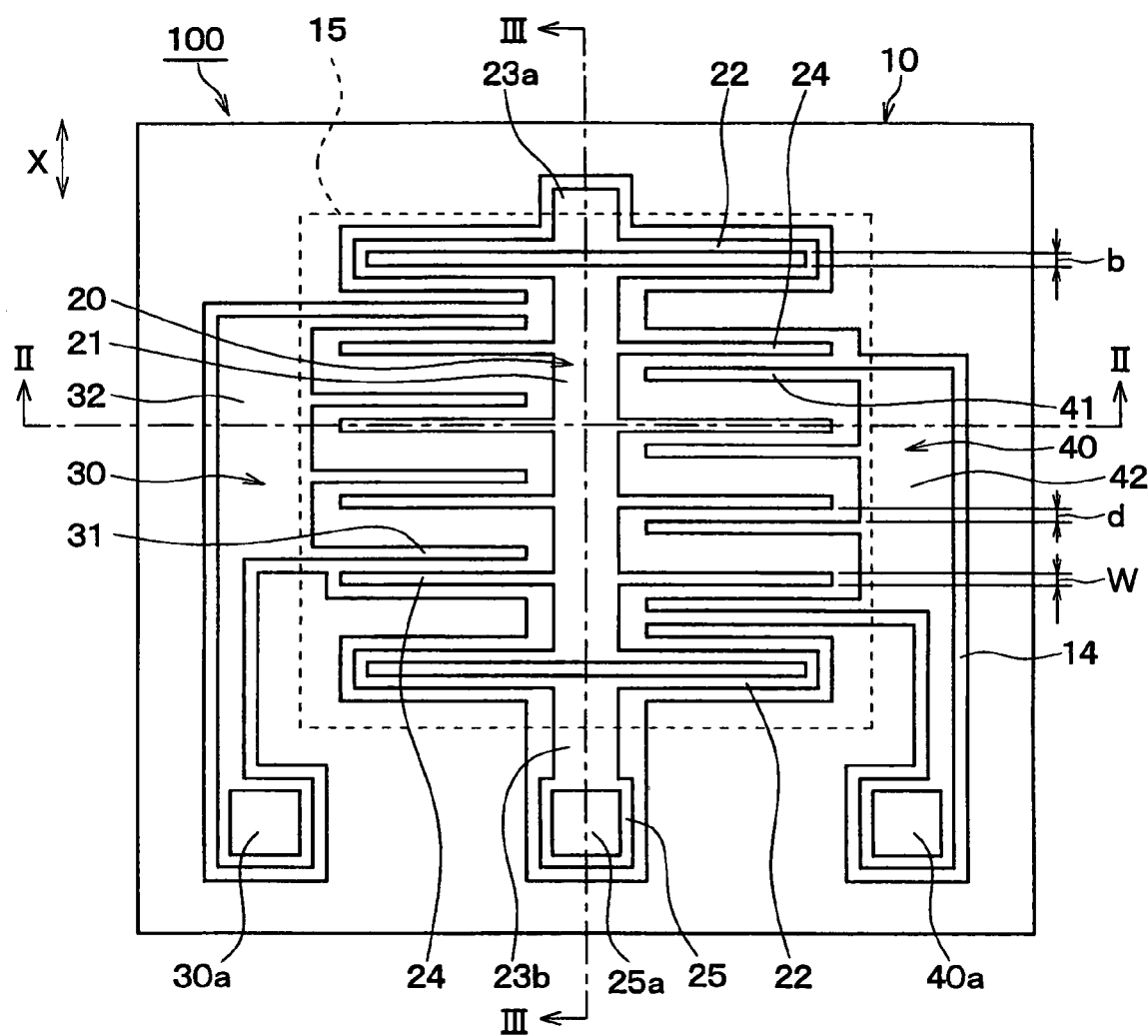
FIG. 1 is a plan view showing a semiconductor acceleration sensor as a semiconductor dynamic quantity sensor according to an embodiment.

Preferred embodiments will be described hereunder with reference to the accompanying drawings. The same or equivalent portions in the figures are represented by the same reference numerals in order to simplify the description.

The first embodiment is applied to a differential capacitance type semiconductor acceleration sensor as a capacitance type semiconductor dynamic quantity sensor. This acceleration sensor may be applied to a vehicle acceleration sensor for controlling the actuation of an air bag, ABS, VSC or the like, a gyro sensor or the like.

Figure 2:
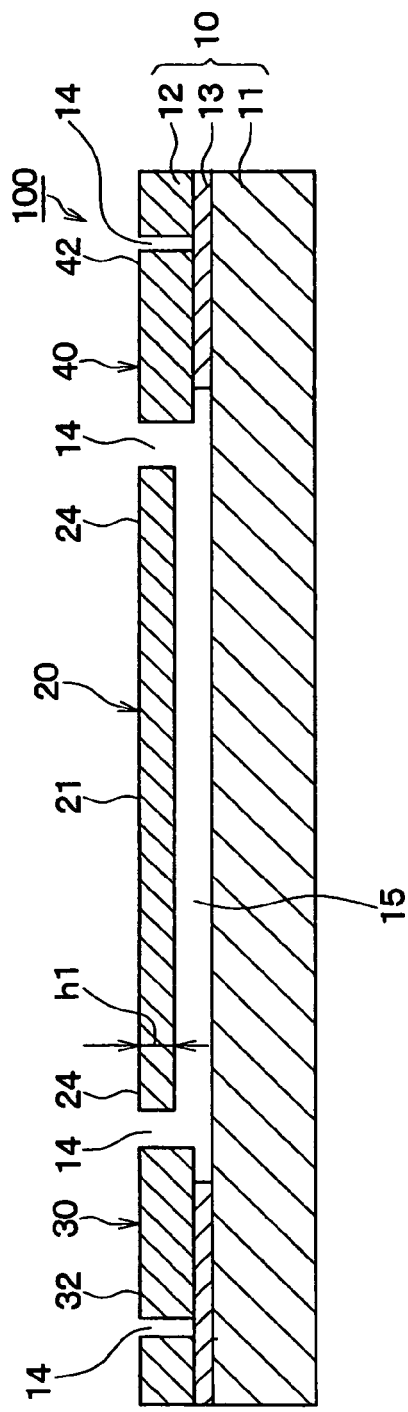
FIG. 2 is a cross-sectional view taken along line II—II of FIG. 1.
Figure 3:
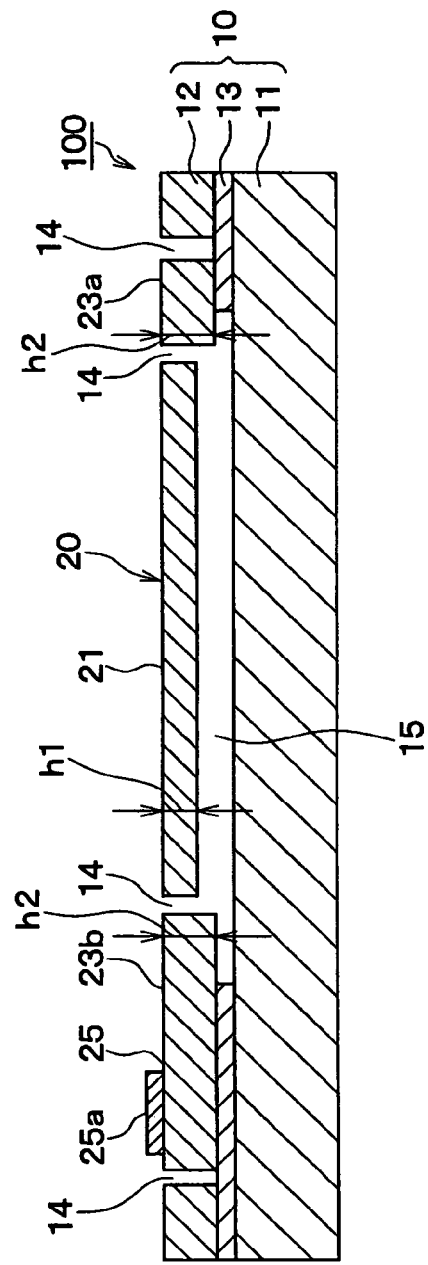
FIG. 3 is a cross-sectional view taken along line III—III of FIG. 1.

FIG. 1 is a plan view showing a semiconductor acceleration sensor 100 according to this embodiment, FIG. 2 is a cross-sectional view of the semiconductor acceleration sensor 100 taken along one-dotted chain line II—II of FIG. 1, and FIG. 3 is a cross-sectional view of the semiconductor acceleration sensor 100 taken along one-dotted chain line III—III of FIG. 1.

The semiconductor acceleration sensor 100 is formed by subjecting a semiconductor substrate 10 as a substrate to a well-known micromachining process.

The semiconductor acceleration sensor 100 is roughly equipped with the semiconductor substrate 10 having a semiconductor layer 12 mounted on a support layer, and a weight portion 21 displaceable in a predetermined direction, movable electrodes 24 joined to the weight portion 21 so as to be displaceable integrally with the weight portion 21, fixed electrodes 31, 41 arranged so as to face the movable electrodes 24, and beam-shaped beam portions 22 that are deformable elastically (like a spring) to displace the weight portion 21 are formed by forming trenches 14 in the semiconductor layer 12.

In this embodiment, the semiconductor substrate 10 constituting the semiconductor acceleration sensor 100 is a rectangular SOI (silicon on insulator) substrate 10 having oxide film 13 as an insulting layer between a first silicon substrate 11 as a support layer and a second silicon substrate 12 as a semiconductor layer as shown in FIGS. 2 and 3.

Trenches (grooves) 14 are formed in the second silicon substrate 12 so as to penetrate through the second silicon substrate 12 in the thickness direction thereof, thereby forming patterns sectioned by the trenches 14, that is, beam structures having comb-shapes comprising a movable portion 20 and fixed portions 30, 40.

A site of the oxide film 13 which is located below the second silicon substrate 12 and corresponds to an area where the beam structures 20 to 40 are formed, that is, a site represented by a rectangle 15 indicated by a broken line of FIG. 1 is removed in the form of a rectangle, thereby forming an opening portion 15. The semiconductor acceleration sensor 100 as described above is manufactured as follows.

A mask having the shape corresponding to the beam structures is formed on the second silicon substrate 12 of the SOI substrate 10 by the photolithography technique. Thereafter, trench etching is carried out by dry etching using gas of $CF_4$, $SF_6$ or the like to form trenches 14. Accordingly, the patterns of the beam structures 20 to 40 are collectively formed.

Subsequently, the oxide film 13 is removed by sacrifice layer etching using hydrofluoric acid or the like to form the opening portion 15, whereby the semiconductor acceleration sensor 100 having the released movable portion 20 can be manufactured.

In the semiconductor acceleration sensor 100 as described above, the movable portion 20 disposed so as to traverse the upper side of the opening portion 15 is designed so that both the ends of the slender rectangular weight portion 21 are integrally joined to anchor portions 23a and 23b through the beam portions 22.

As shown in FIG. 3, these anchor portions 23a and 23b are fixed to the opening edge portions of the opening portions 15 in the oxide film 13, and mounted on the first silicon substrate 11 as the support layer. Accordingly, the weight portion 21 and the beam portions 22 are kept to face the opening portion 15 while being away from the first silicon substrate 11.

Furthermore, as shown in FIG. 1, each beam portion 22 is designed to have such a rectangular frame shape that two parallel beams are joined to each other at both ends thereof, and it has such a spring function that it is displaced in a direction perpendicular to the longitudinal direction of the two beams.

Specifically, when an acceleration containing a component in the direction of an arrow X of FIG. 1 is applied to the beam portion 22, the beam portion displaces the weight portion 21 in the direction of the arrow X, and also restores the weight portion 21 to the original state in response to dissipation of the acceleration.

Accordingly, the movable portion 20 is displaceable in the displacement direction of the beam portion 22, that is, in the direction of arrow X on the opening portion 15 in the horizontal direction of the substrate surface in accordance with the applied acceleration. The direction of arrow X will be hereinafter referred to as the displacement direction X of the beam portion 22.

As shown in FIG. 1, the movable portion 20 is provided with a movable electrode 24 that is joined to the weight portion 21 and displaced integrally with the weight portion 21. In this embodiment, the movable electrodes 24 are arranged in a comb-shape, and they are designed in such a beam-shape that they extend from both the side surfaces of the weight portion 21 in the opposite directions in the direction perpendicular to the displacement direction X of the beam portions 22.

In other words, the plural movable electrodes 24 are arranged in a comb-shape along the displacement direction X while the displacement direction X of the beam portion 22 is set to the arrangement direction. In FIG. 1, four movable electrodes 24 are formed at each of the right and left sides of the weight portion 21 so as to project from the weight portion 21. Each movable electrode 24 is designed in a beam-shape having a rectangular section, and it is kept away from the first silicon substrate 11 while facing the opening portion 15.

As described above, each movable electrode 24 is formed integrally with the beam portions 22 and the weight portion 21, whereby the beam portions 22 and the weight portion 21 are displaceable in the displacement direction X of the beam portions 22 in the horizontal direction of the substrate surface.

Furthermore, as shown in FIGS. 1 to 3, the fixed portions 30, 40 are fixed to the oxide film 13 at a pair of confronting side portions on which the anchor portions 23a and 23b are not mounted, out of the two pairs of confronting side portions of the opening edge portion of the opening portion 15. The fixed portions 30, 40 are mounted on the first silicon substrate 11 through the oxide film 13.

In FIG. 1, the fixed portion 30 located at the left side of the weight portion 21 comprises the fixed electrodes 31 at the left side and wire portions 32 for the fixed electrodes at the left side. In FIG. 1, the fixed portion 40 located at the right side of the weight portion 21 comprises the fixed electrodes 40 at the right side and wire portions 42 for the fixed electrodes at the right side.

In this embodiment, as shown in FIG. 1, the fixed electrodes 31, 41 are located above the opening portion 15, and the plural fixed electrodes 31, 41 are arranged in a comb-shape so as to be engaged with the gaps between the neighboring movable electrodes 24 arranged in a comb-shape.

Here, in FIG. 1, with respect to the left side of the weight portion 21, the left-side fixed electrodes 31 are provided at the upper side of each movable electrode 24 along the displacement direction X. Furthermore, with respect to the right side of the weight portion 21, the right-side fixed electrodes 41 are provided at the lower side of each movable electrode 24 along the displacement direction X.

As described above, the fixed electrodes 31, 41 are disposed so as to face the individual movable electrodes 24 in the horizontal direction of the substrate surface, and a detection interval for detecting the capacitance between the side surface (that is, the detection face) of the movable electrode 24 and the side surface (that is, the detection face) of the fixed electrode 31, 41 is formed in each confronting interval.

The left-side fixed electrodes 31 and the right-side fixed electrodes 41 are electrically independently of each other. Each of the fixed electrodes 31, 41 is designed in a beam-shape so as to extend substantially in parallel to the movable electrode 24 and has a rectangular section.

Here, the left-side fixed electrodes 31 and the right-side fixed electrodes 41 are kept to be cantilevered by the fixed electrode wire portions 32, 42 fixed to the first silicon substrate 11 through the oxide film 13, respectively. The fixed electrodes 31, 41 are kept to be away from the oxide film 13.

As described above, in this embodiment, with respect to the left-side fixed electrodes 31 and the right-side fixed electrodes 41, a plurality of respective electrodes are collected by each of the electrically common wire portions 32, 42.

Furthermore, a left-side fixed electrode pad 30a and a right-side fixed electrode pad 40a are formed at predetermined positions on the left-side fixed electrode wire portion 32 and the right-side fixed electrode wire portion 40, respectively.

Furthermore, a movable electrode wire portion 25 is formed so as to be integrally joined to one anchor portion 23b, and a movable electrode pad 25a is formed at a predetermined position on the wire portion 25. Each of the electrode pads 25a, 30a, 40a are formed by sputtering or depositing aluminum, for example.

In the semiconductor acceleration sensor 100 of this embodiment thus constructed, the thickness h2 of the beam portion 22 as the thickness along the thickness direction of the second silicon substrate 12 as the semiconductor layer is set to be larger than the thickness h1 of the movable electrode 24 as shown in FIGS. 2 and 3.

In this embodiment, the thickness of the movable electrode 24 and the thickness of the weight portion 21 are set to be equal to each other, and thus the thickness h2 of the beam portion 22 is larger than the thickness of the weight portion 21. However, the movable electrode 24 and the weight portion 21 may alternatively be different from each other in thickness.

Accordingly, the beam portions 22 and the weight portion 21 may be equal to each other in thickness, or the beam portions 22 may be thinner than the weight portion 21. That is, in this embodiment, it would be sufficient if the beam portions 22 are larger in thickness than the movable electrode 24 serving as the site that faces the fixed electrode 31, 41 and constitutes the detection interval in the movable portion.

Here, as shown in FIG. 1, the respective dimensions are defined so that the width of the beam portion 22 is represented by the beam width b, the interval between the movable electrode 24 and the fixed electrode 31, 41, that is, the detection interval is represented by the electrode interval d, and the width of the movable electrode 24 is represented by the electrode width W.

At this time, in this embodiment, when the ratio b/d of the beam width b to the electrode interval d is set to 1.0 to 1.75 and the ratio W/b of the electrode width W to the beam width b is set to 1.0 to 3.0, the ratio h1/h2 of the thickness h1 of the movable electrode 24 to the thickness h2 of the beam portion 22 can be set to 0.2 to 0.8.

The construction that the thickness h2 of the beam portion 22 is larger than the thickness h1 of the movable electrode 24 can be easily implemented by varying the thickness of the oxide film 13 serving as the sacrifice layer in advance in the process of manufacturing the SOI substrate 10. That is, in this embodiment, if the thickness of the oxide film 13 below the movable electrode 24 is set to be larger than the thickness of the oxide film 13 below the beam portion 22, this construction could be formed.

The semiconductor acceleration sensor 100 thus constructed has a circuit portion containing a detection circuit (see FIG. 4 described later) for processing an output signal from the semiconductor acceleration sensor 100, a circuit for examination, etc.

The circuit portion as described above is provided to a circuit chip achieved by forming MOS transistor elements, etc. in a semiconductor substrate such as a silicon substrate or the like through a semiconductor process to constitute a circuit, and the circuit chip thus constructed and the semiconductor acceleration sensor 100 are electrically connected to each other through bonding wires or bumps.

Next, the detecting operation of the capacitance type semiconductor acceleration sensor 100 of this embodiment will be described. According to this embodiment, the acceleration is detected on the basis of the electrostatic capacitance variation between the movable electrode 24 and the fixed electrode 31, 41 in connection with the application of the acceleration.

As described above, in the semiconductor acceleration sensor 100, the movable electrodes 24 and the fixed electrodes 31, 41 are provided so that the side surfaces (detection faces) of the fixed electrodes 31, 41 confront the side surfaces (that is, detection faces) of the individual movable electrodes 24, and the detection interval for detecting the capacitance is formed in each confronting interval between the side surfaces of both the electrodes.

Here, first capacitance CS1 is formed as detection capacitance at the interval between the left-side fixed electrodes 31 and the movable electrodes 24, and second capacitance CS2 is formed as detection capacitance at the interval between the right-side fixed electrodes 41 and the movable electrodes 24.

In the sensor 100, when an acceleration is applied in the displacement direction X of FIG. 1 in the horizontal direction of the substrate surface, the whole movable portion 20 excluding the anchor portions is integrally displaced in the displacement direction X by the spring function of the beam portions 22, and each capacitance CS1, CS2 is varied in accordance with the displacement of the movable electrodes 24 in the displacement direction X.

For example, a case where the movable portion 20 is downwardly displaced along the displacement direction X in FIG. 1 is considered. At this time, the interval between the left-side fixed electrode 31 and the movable electrode 24 is increased, and the interval between the right-side fixed electrode 41 and the movable electrode 14 is reduced.

Accordingly, the acceleration in the direction of the arrow X can be detected on the basis of the variation of the differential capacitance (CS1−CS2) between the movable electrodes 24 and the fixed electrodes 31, 41. Specifically, the signal based on the capacitance difference (CS1−CS2) is output as an output signal from the semiconductor acceleration sensor 100. This signal is processed in the circuit portion and finally output.

Figure 4:
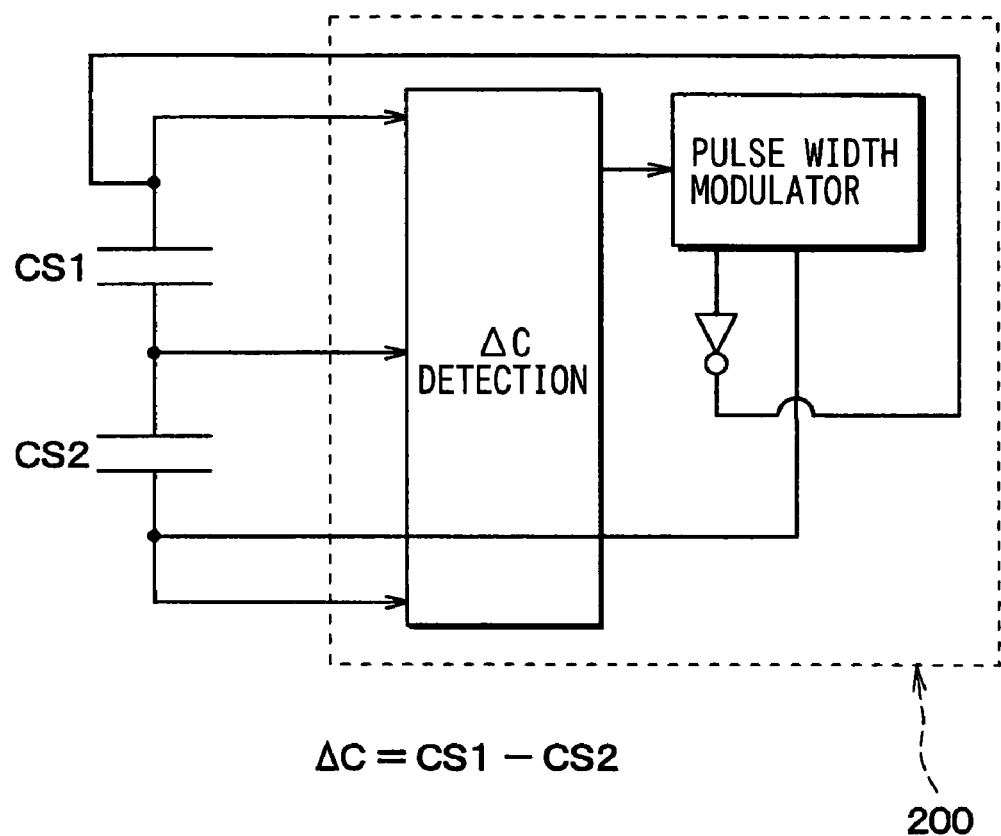
FIG. 4 is a circuit diagram showing an example of a detection circuit in the semiconductor acceleration sensor of the embodiment.

FIG. 4 is a circuit diagram showing an example of a detection circuit 200 for detecting the acceleration in the capacitance type semiconductor acceleration sensor 100 according to this embodiment.

In this detection circuit 200, a ΔC detecting circuit converts the input capacitance difference (CS1−CS2) to a voltage.

The applied acceleration in the displacement direction X is output as a voltage value V0 as shown in the following equation 1.

$$V0 = (CS1 - CS2) \cdot V/(CS1 + CS2) \quad \text{(Equation 1)}$$

The acceleration is detected as described above.

According to this embodiment, the semiconductor substrate 10 having the first silicon substrate 11 as the support layer and the second silicon substrate 12 as the semiconductor layer mounted on the first silicon substrate 11 is provided, and the trenches 14 are formed in the second silicon substrate 12 to form the weight portion 21 displaceable in the predetermined direction, that is, in the displacement direction X, the movable electrodes 24 joined to the weight portion 21 so as to be displaced integrally with the weight portion 21, the fixed electrodes 31, 41 arranged so as to face the movable electrodes 24 and the beam-shaped beam portions 22 deformable elastically (like a spring) to displace the weight portion 21. When an acceleration is applied as a dynamic quantity, the distance between the movable electrode 24 and the fixed electrode 31, 41 is varied, and the capacitance between the electrode 24 and the electrode 31 (41) is varied. In the capacitance type semiconductor acceleration sensor for detecting the applied acceleration on the basis of the capacitance variation between both electrodes 24, 31, 41, the thickness h2 of the beam portion 22 is larger than the thickness h1 of the movable electrode 24.

According to this embodiment, the thickness h2 of each beam portion 22 is set to be larger than the thickness h1 of each movable electrode 24 as described above. The reason why the above construction is adopted will be described below.

In the capacitance type semiconductor dynamic quantity sensor as described above, the sensitivity is proportional to the capacitance variation ΔC. This capacitance variation is represented by the following equation 2.

$$\text{Sensitivity } S \propto (C0 \cdot m)/k \quad \text{(Equation 2)}$$

Here, in the above equation 2, Co: the inter-electrode capacitance value for acceleration=0, m: the mass of movable portion (that is, the total mass of the weight portion 21 and the movable electrodes 24), k: the spring constant of the beam portions 22, d: the electrode interval.

In the semiconductor acceleration sensor 100, the processing dispersion contains residual silicon width dispersion Δd corresponding to line width dispersion, electrode thickness dispersion Δh1 corresponding to the thickness dispersion of the movable electrodes 24 and the beam thickness dispersion Δh2 corresponding to the thickness dispersion of the beam portions 22.

From the above equation 2, the sensitivity dispersion ΔS based on the residual silicon width dispersion Δd, the electrode thickness dispersion Δh1 and the beam thickness dispersion Δh2 is represented by the following equation 3.

$$S + \Delta S \propto \frac{\frac{(h1 + \Delta h1)}{(d - \Delta d)} \cdot (h1 + \Delta h1) \cdot (W + \Delta d)}{(h2 + \Delta h2) \cdot (b + \Delta d)^3} \quad \text{(Equation 3)}$$

Here, in the equation 3, h1: the thickness of the movable electrode 24, h2: the thickness of the beam portion 22, W: the width of the movable electrode 24 (electrode width), b: the width of the beam portion 22 (beam width), d: the electrode interval That is, when the ratio h1/h2 of the thickness h1 of the movable electrode 24 to the thickness h2 of the beam portion 22 is reduced, the sensitivity dispersion ΔS has the minimum value for some value of the ratio h1/h2. An analysis result of the sensitivity variation due to the processing dispersion is shown in FIG. 5.

Figure 5:
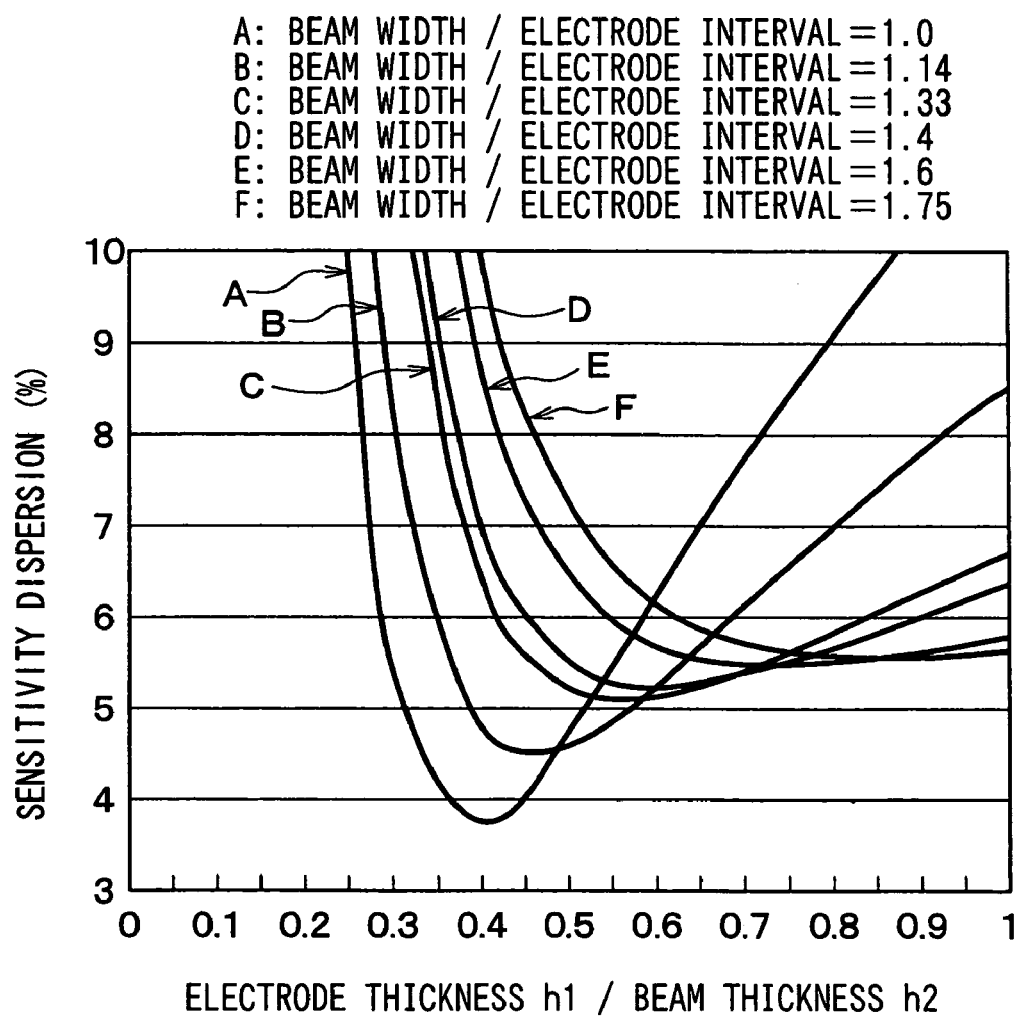
FIG. 5 is a diagram showing the relationship between the ratio h1/h2 of the thickness h1 of the movable electrode to the thickness h2 of the beam portion and sensitivity dispersion $\Delta S$.

FIG. 5 is a graph showing the relationship between the sensitivity dispersion ΔS (unit: %) and the ratio h1/h2 as the processing dispersion of the thickness of the beam portions 22 and the thickness of the movable electrodes 24. In FIG. 5, the ratio h1/h2 is illustrated as "electrode thickness h1/beam thickness h2".

FIG. 5 shows the sensitivity dispersion ΔS when the thickness dispersion is equal to 20% and the width dispersion is equal to 40% as the processing dispersion which may generally occur in the beam portions 22 and the movable electrodes 24 in the case where the beam width d=the electrode width W, that is, the ratio W/b of the electrode width W to the beam width b is equal to 1.0.

FIG. 5 shows the relationship between the ratio h1/h2 and the sensitivity dispersion ΔS when the radio b/d of the beam width b to the electrode interval d is equal to 1.0 (curved line A), 1.14 (curved line B), 1.33 (curved line C), 1.4 (curved line D), 1.6 (curved line E) and 1.75 (curved line F). In FIG. 5, the ratio b/d is represented as "beam width/electrode interval".

As shown in FIG. 5, for each case where the ratio b/d ranges from 1.0 to 1.75, if the ratio h1/h2 of the thickness h1 of the movable electrode 24 to the thickness h2 of the beam portion 22 is less than 1, that is, the thickness h2 of the beam portion 22 is larger than the thickness h1 of the movable electrode 24, the sensitivity dispersion ΔS would have the minimum value, that is, the sensitivity dispersion could be reduced to the minimum level.

Here, according to the result shown in FIG. 5, the effect of the processing dispersion Δd of the line width is small for the inflection point of a quadratic function indicating the above relationship.

Furthermore, according to the analysis of the inventor of this application, it has been found that the inflection point of the quadratic function of FIG. 5, that is, the value at which the sensitivity dispersion ΔS is minimum is varied not only by the ratio b/d of the beam width b to the electrode interval d, but also by the ratio W/b of the electrode width W to the beam width b.

Figure 6:
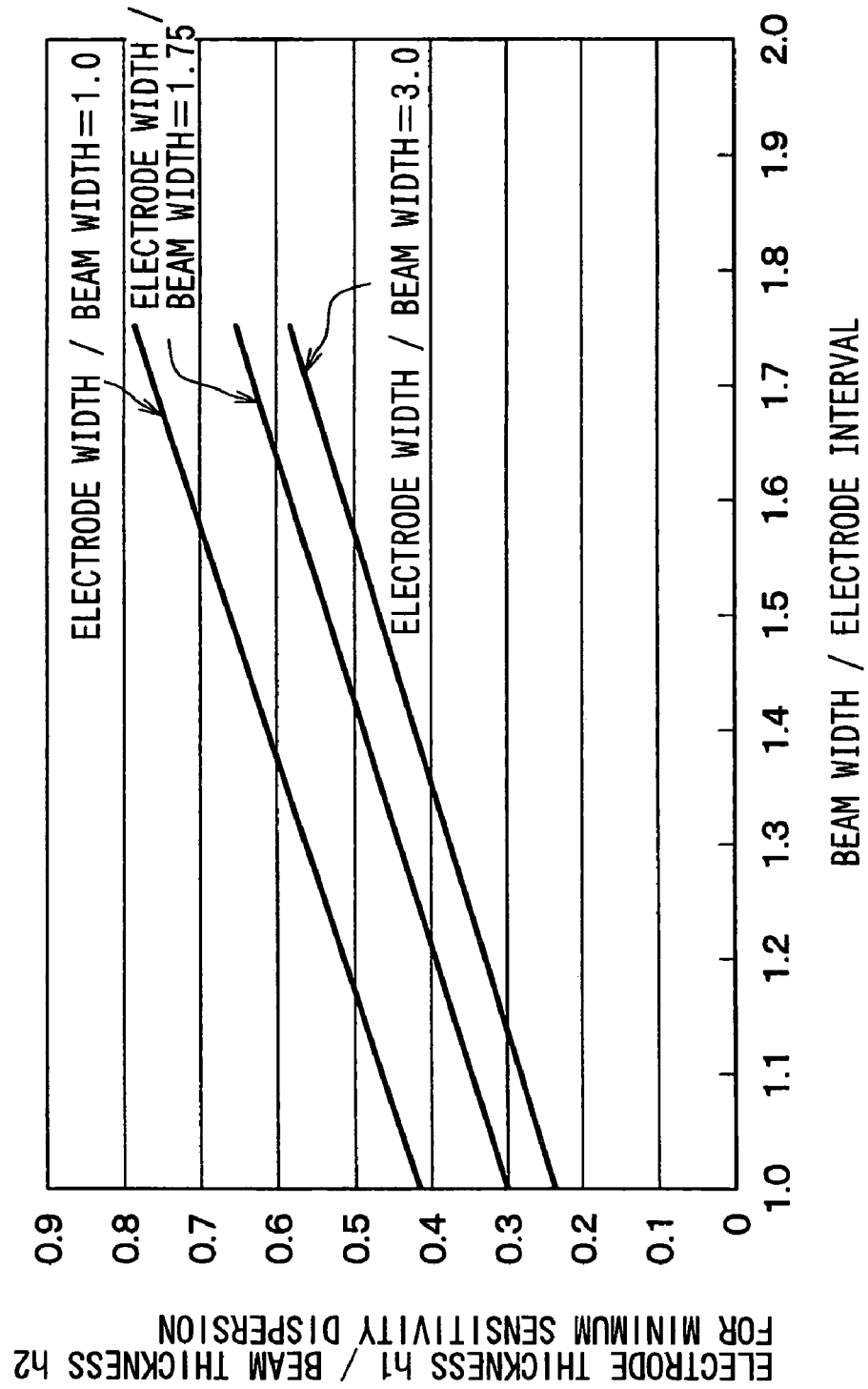
FIG. 6 is a diagram showing the relationship between the ratio W/b of the electrode width W to the beam width b and the ratio h1/h2 at which the sensitivity dispersion $\Delta S$ is minimum.

FIG. 6 is a graph showing the relationship between the ratio W/b of the electrode width W to the beam width b and the ratio h1/h2 at which the sensitivity dispersion ΔS would be equal to the minimum value. In FIG. 6, the ratio b/d is represented as "beam width/electrode interval", and the ratio h1/h2 at which the sensitivity dispersion ΔS would be equal to the minimum value is represented as "minimum sensitivity dispersion electrode thickness h1/beam thickness h2".

FIG. 6 shows the sensitivity dispersion ΔS when the thickness dispersion is equal to 20% and the width dispersion is equal to 40% as the processing dispersion which may generally occur in the beam portions 22 and the movable electrodes 24 in the case where the ratio W/b of the electrode width W to the beam width b is equal to 1.0, 1.75, 3.0.

That is, FIG. 6 shows a result achieved by determining the relationship as shown in FIG. 5 when the ratio W/b of the electrode width W to the beam width b is set to 1.0, 1.75, 3.0, and then plotting data on the basis of the inflection point of each quadratic function in the above relationship.

As shown in FIG. 6, when the ratio b/d of the beam width b to the electrode interval d ranges from 1.0 to 1.75 and the ratio W/b of the electrode width W to the beam width b is equal to 1.0, if the ratio h1/h2 of the thickness h1 of the movable electrode 24 to the thickness h2 of the beam portion 22 is substantially equal to 0.4 to 0.8, the sensitivity dispersion ΔS described above would be equal to the minimum value.

Furthermore, when the ratio b/d of the beam width b to the electrode interval d ranges from 1.0 to 1.75 and the ratio W/b of the electrode width W to the beam width b is equal to 1.75, if the ratio h1/h2 of the thickness h1 of the movable electrode 24 to the thickness h2 of the beam portion 22 is substantially equal to 0.3 to 0.7, the above sensitivity dispersion ΔS would be equal to the minimum value.

When the ratio b/d of the beam width b to the electrode interval d ranges from 1.0 to 1.75 and the ratio W/b of the electrode width W to the beam width b is equal to 3.0, if the ratio h1/h2 of the thickness h1 of the movable electrode 24 to the thickness h2 of the beam portion 22 is substantially equal to 0.2 to 0.6, the sensitivity dispersion ΔS would be equal to the minimum value.

That is, from FIG. 6, when the ratio b/d of the beam width b to the electrode interval d ranges from 1.0 to 1.75 and the ratio W/b of the electrode width W to the beam width b ranges from 1.0 to 3.0, if the ratio h1/h2 of the thickness h1 of the movable electrode 24 to the thickness h2 of the beam portion 22 is substantially equal to 0.2 to 0.8, the sensitivity dispersion ΔS would be equal to the minimum value.

The foregoing is the ground to adopt the construction that the thickness h2 of the beam portion 22 is set to be larger than the thickness h1 of the movable electrode 24.

According to this embodiment, if the thickness h2 of the beam portion 22 is set to be larger than the thickness h1 of the movable electrode 24, that is, the relationship of h1<h2 is satisfied, the sensitivity dispersion can be reduced to the minimum level even when some processing dispersion exists in the thickness of the beam portion 22 or the thickness of the movable electrode 24 as shown in FIG. 5.

That is, according to this embodiment, in the capacitance type semiconductor dynamic quantity sensor 100 in which the movable electrodes 24, the fixed electrodes 31, 41 and the beam portions 22 for displaying the movable electrodes 24 are formed by forming the trenches 14 in the semiconductor layer 12 mounted on the support layer 11, the sensitivity of the sensor can be made to be hardly affected by the processing dispersion in the thickness of the beam portion 22 or the thickness of the movable electrode 24.

As shown in FIGS. 5 and 6, when the ratio b/d of the beam width b to the electrode interval d ranges from 1.0 to 1.75 and the ratio W/b of the electrode width W to the beam width b ranges from 1.0 to 3.0, if the ratio h1/h2 of the thickness h1 of the movable electrode 24 to the thickness h2 of the beam portion 22 ranges from 0.2 to 0.8, the sensitivity dispersion ΔS would be equal to the minimum value, and the effect of this embodiment could be properly implemented.

Furthermore, in this embodiment, as described above, a plurality of movable electrodes 24 are arranged in a comb-shape, and further a plurality of fixed electrodes 31, 41 are arranged in a comb-shape so as to be engaged with the intervals between the movable electrodes 24 (the teeth of the comb-shape).

[Modification]

In the embodiment shown in FIGS. 2 and 3, in the semiconductor acceleration sensor 100, the lower portion of the movable electrode 24 is more greatly etched by varying the thickness of the oxide film 13 as the sacrifice layer, whereby the movable electrode 24 is set to be thinner than the beam portion 22.

Figure 7:
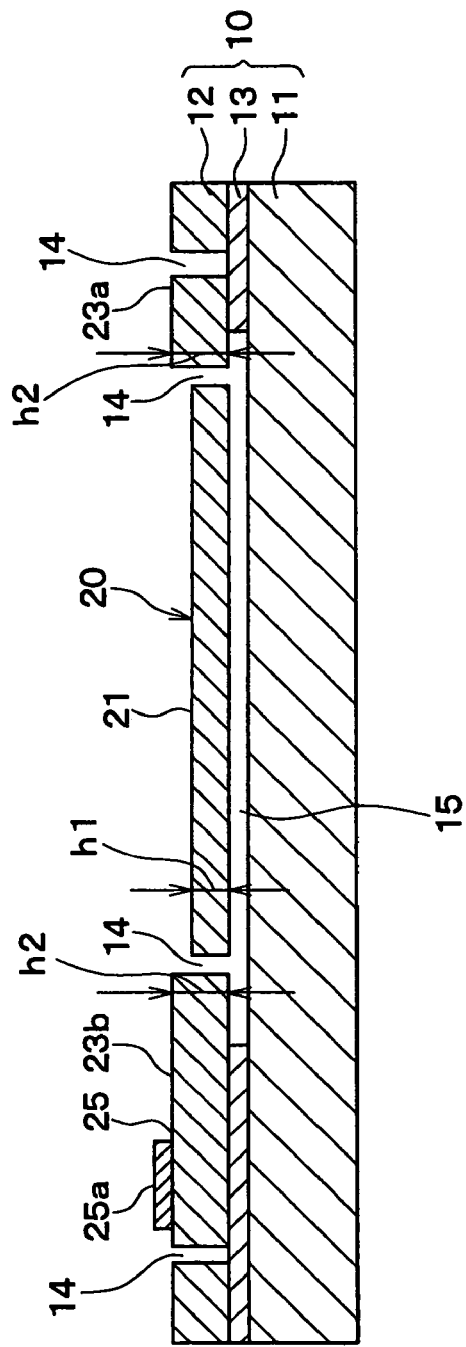
FIG. 7 is a cross-sectional view showing a semiconductor acceleration sensor according to a first modification of the embodiment.
Figure 8:
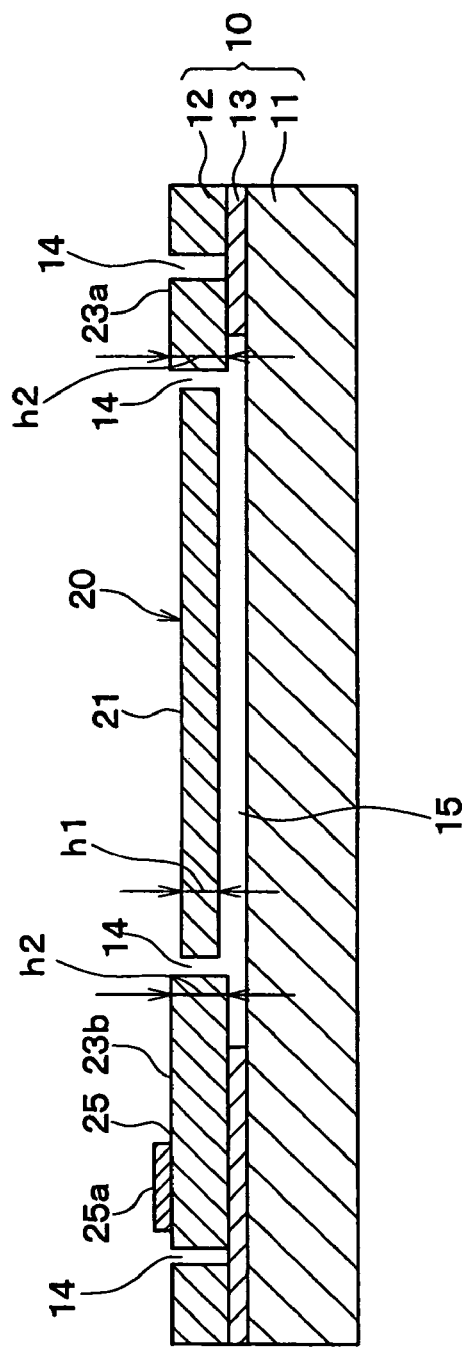
FIG. 8 is a cross-sectional view showing a semiconductor acceleration sensor according to a second modification of the embodiment.
Figure 9:
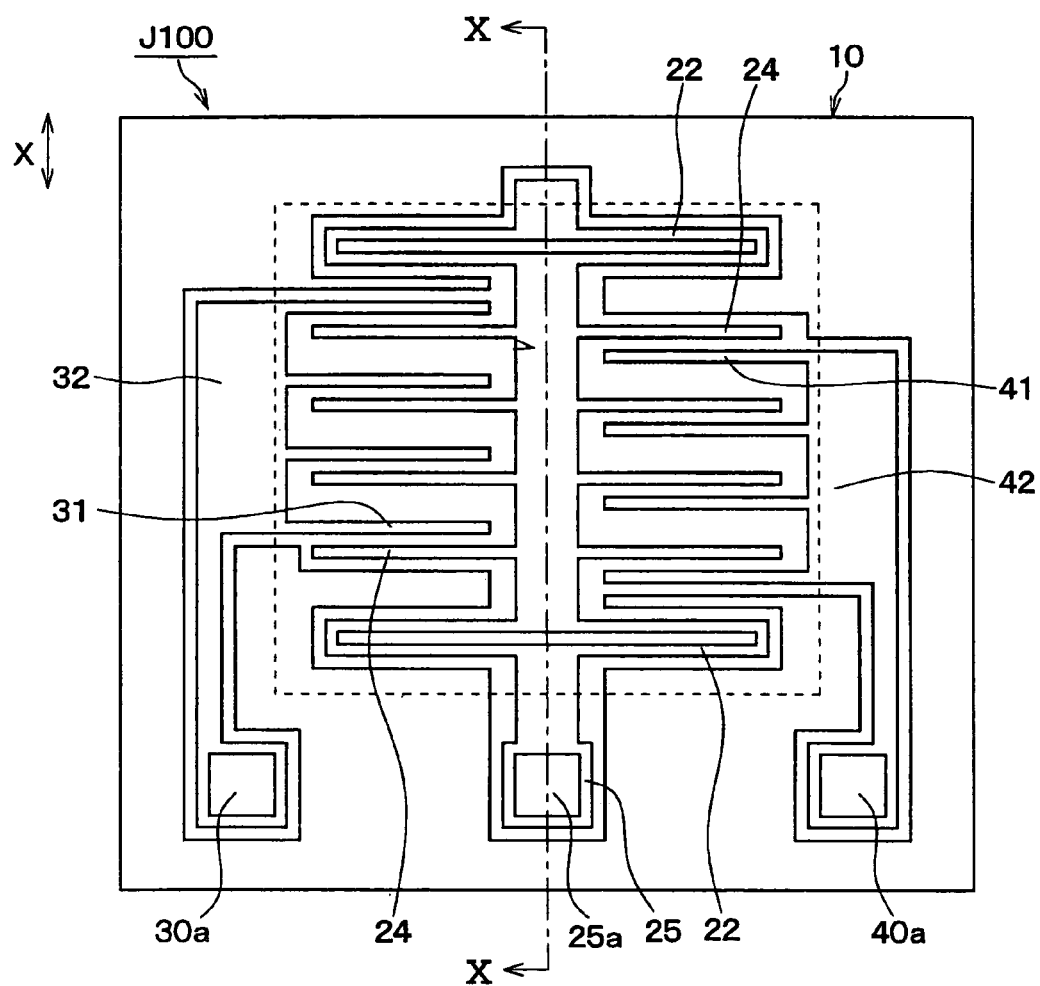
FIG. 9 is a diagram showing a general planar construction of a conventional semiconductor dynamic quantity sensor.
Figure 10:
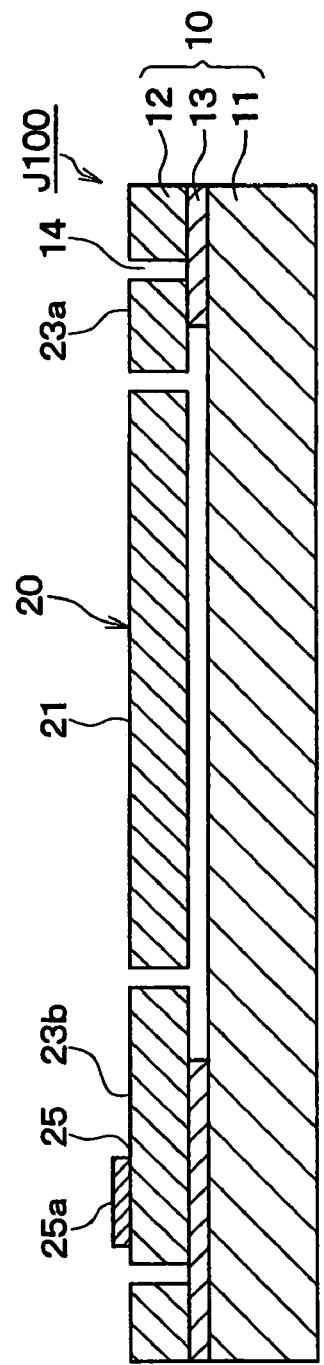
FIG. 10 is a cross-sectional view taken along line X—X of FIG. 9.

In this embodiment, the construction that the thickness h2 of the beam portion 22 is set to be larger than the thickness h1 of the movable electrode 24 is not limited to the embodiment of FIGS. 2 and 3, and it may be applied to embodiments shown in FIGS. 7 and 8.

FIG. 7 is a cross-sectional view showing a semiconductor acceleration sensor according to a first modification of the above embodiment, and FIG. 8 is a cross-sectional view showing a semiconductor acceleration sensor according to a second modification of the above embodiment. FIGS. 7 and 8 are the cross-sectional views corresponding to FIG. 3, and show the semiconductor acceleration sensor.

According to the first modification shown in FIG. 7, not the lower portion of the movable electrode 24, but the upper portion, that is, the surface of the movable electrode 24 is more greatly etched, thereby implementing the construction that the movable electrode 24 is thinner than the beam portion 22.

In this case, it is unnecessary to vary the thickness of the oxide film 13 as the sacrifice layer by the movable electrode 24 and the beam portion 22. Specifically, for example, a mask is formed by a photolithography method so that the surface of the movable electrode 24 is opened, and under this state the surface of the movable electrode 24 is selectively etched by dry etching or the like.

According to the second modification shown in FIG. 8, both the upper and lower portions of the movable electrode 24, that is, both the surfaces of the movable electrode 24 are greatly etched to thereby implement the construction that the movable electrode 24 is thinner than the beam portion 22.

In this case, of course the construction of the second modification can be easily implemented by using both the etching methods of the embodiment shown in FIGS. 2 and 3 and the embodiment shown in FIG. 7.

The first and second modifications shown in FIGS. 7 and 8 can also achieve the effect of the first embodiment. That is, the semiconductor acceleration sensor shown in these modifications makes the sensitivity of the sensor hardly suffer the effect of the processing dispersion of the thickness of the beam portion 22 or the thickness of the movable electrode 24.

(Other Embodiments)

In the semiconductor acceleration sensor of the above embodiment, a plurality of movable electrodes 24 are arranged in a comb-shape, and also a plurality of fixed electrodes 31, 41 are also arranged in a comb-shape so that each of the fixed electrodes is engaged with the interval between the neighboring movable electrodes 24. However, the construction of the electrodes is not limited to the above embodiment.

Furthermore, the beam portion is not limited to the rectangular frame construction in which two parallel beams are joined to each other at both the ends thereof as in the case of the embodiments described above. The beam portion may be designed, for example, in a folded shape insofar as it has a spring function to displace the weight portion in a predetermined direction.

Furthermore, with respect to the weight portion and the movable electrodes integrally joined to the weight portion, they are not limited to the constructions of the above embodiments. Furthermore, the acceleration sensor is not limited to the differential capacitance type.

Still furthermore, the present invention may be applied to not only the acceleration sensor device described above, but also a dynamic quantity sensor device such as an angular velocity sensor for detecting an angular velocity as a dynamic quantity or the like.

In short, in the capacitance type semiconductor dynamic quantity sensor in which a substrate having a support layer and a semiconductor layer mounted on the support layer is provided, a weight portion displaceable in a predetermined direction, movable electrodes joined to the weight portion so as to be displaceable integrally with the weight portion, fixed electrodes arranged so as to confront the movable electrodes and beam-shaped beam portions elastically deformable to displace the weight portion are formed by forming trenches in the semiconductor layer, the distance between the movable electrode and the fixed electrode is varied when a dynamic amount is applied, and the applied dynamic quantity is detected on the basis of the capacitance variation between both the electrodes in connection with the variation of the distance, the thickness h2 of the beam portion is set to be larger than the thickness h1 of the movable electrode. The other constructions may be properly changed in design.

What is claimed is:

1. A capacitance type semiconductor dynamic quantity sensor comprising:
    a substrate having a support layer and a semiconductor layer mounted on the support layer;
    a weight portion displaceable in a predetermined direction;
    movable electrodes joined to the weight portion so as to be displaceable integrally with the weight portion;
    fixed electrodes disposed so as to confront the movable electrodes; and
    beam-shaped beam portions that are deformable elastically to displace the weight portion,
    wherein the weight portion, the movable electrodes, the fixed electrodes and the beam-shaped beam portions are formed by forming trenches in the semiconductor layer, wherein when a dynamic quantity is applied, the distance between each movable electrode and each fixed electrode is varied, and the applied dynamic quantity is detected based upon a capacitance variation between the fixed electrode and movable electrode caused by the variation of the distance, wherein the thickness h2 of the beam portion is set to be larger than the thickness h2 of the movable electrode.

2. The semiconductor dynamic quantity sensor according to claim 1, wherein the width of each beam portion is represented by a beam width b, the interval between each movable electrode and each fixed electrode is represented by an electrode interval d and the width of each movable electrode is represented by an electrode width W, and when the ratio of the beam width b to the electrode interval d is set to 1.0 to 1.75 and the ratio of the electrode width W to the beam width b is set to 1.0 to 3.0, the ratio of the thickness h1 of the movable electrode to the thickness h2 of the beam portion is set to 0.2 to 0.8.

3. The semiconductor dynamic quantity sensor according to claim 2, wherein when the ratio (b/d) of the beam width b to the electrode interval d is set to 1.0 to 1.75 and the ratio (W/b) of the electrode width W to the beam width b is set to 1.0, the ratio (h1/h2) of the thickness h1 of the movable electrode to the thickness of the beam portion is set to 0.4 to 0.8.

4. The semiconductor dynamic quantity sensor according to claim 2, wherein when the ratio (b/d) of the beam width b to the electrode interval d is set to 1.0 to 1.75 and the ratio (W/b) of the electrode width W to the beam width b is set to 1.75, the ratio (h1/h2) of the thickness h1 of the movable electrode to the thickness h2 of the beam portion is set to 0.3 to 0.7.

5. The semiconductor dynamic quantity sensor according to claim 2, wherein when the ratio (b/d) of the beam width b to the electrode interval d is set to 1.0 to 1.75 and the ratio (W/b) of the electrode width W to the beam width b is set to 3.0, the ratio (h1/h2) of the thickness h1 of the movable electrode to the thickness h2 of the beam portion is set to 0.2 to 0.6.

6. The semiconductor dynamic quantity sensors according to claim 1, wherein a plurality of movable electrodes are arranged in a comb-shape and a plurality of fixed electrodes are arranged in a comb-shape so that each of the fixed electrodes is engaged with the gap between the neighboring movable electrodes arranged in a comb-shape.

* * * * *